(12) United States Patent  
Slominski et al.

(10) Patent No.: US 6,374,180 B1
(45) Date of Patent: Apr. 16, 2002

(54) POINTS OF INTEREST FOR A NAVIGATION SYSTEM

(75) Inventors: Anthony A. Slominski, Harrison Township; Jeffrey Alan Millington, Rochester Hills, both of MI (US)

(73) Assignee: Magellan DIS, Inc., Rochester, MI (US)

( * ) Notice: Subject to any disclaimer, the term of this patent is extended or adjusted under 35 U.S.C. 154(b) by 0 days.

(21) Appl. No.: 09/661,982

(22) Filed: Sep. 18, 2000

(51) Int. Cl.[7] ............................................... G01C 21/36

(52) U.S. Cl. ..................... 701/208; 701/209; 701/211; 340/988; 340/990

(58) Field of Search .................................. 701/208, 201, 701/207, 209, 211; 340/988, 990, 995; 73/178 R

(56) References Cited

U.S. PATENT DOCUMENTS 5,825,306 A * 10/1998 Hiyokawa et al. .......... 340/988
5,832,408 A 11/1998 Tamai et al. ................ 701/208

* cited by examiner

*Primary Examiner*—Yonel Beaulieu
(74) *Attorney, Agent, or Firm*—Carlson, Gaskey & Olds

(57) ABSTRACT

A navigation system that enables a user to search for points of interest across categories is provided. The user may enter a character string of a desired destination into the navigation system using a user input device. The navigation system will search for points of interest in the database for the character string. The character string may be from the first portion of the name of the point of interest or somewhere in the middle of the name of the point of interest. In this manner, the user will be able to locate a point of interest from the database while having a partially incorrect name. Additionally, the navigation system may relate the points of interest to the vehicle location, such as by vehicle direction or proximity of the points of interest to the vehicle.

18 Claims, 3 Drawing Sheets

POINTS OF INTEREST FOR A NAVIGATION SYSTEM

BACKGROUND OF THE INVENTION

This invention relates to navigation systems, and more particularly, to navigation systems using an improved method of finding points of interest.

Navigation systems generally provide a recommended route from a starting point to a desired destination. Typically, one or both of the starting points and the desired destination are selected from a large database of roads and particular locations or points of interest that are stored in a mass media storage. When the user desires directions to a particular location, the user may conduct a search for the desired destination from the database and then select the destination from a hit list to generate the map thereto. The points of interest have typically been organized in the database by categories, such as restaurants and hotels. Most navigation systems have been limited in that the user was only able to search a particular category at a time. That is, the user would have to preselect the category prior to searching for the point of interest. Frequently, a particular destination may be stored in a category other than the category anticipated by the user. As a result, after the user conducted a search in the category, the desired destination would not be found.

An improved method of searching for points of interest has been developed in which the user is able to search across categories enabling the user to find the particular point of interest regardless of how the point of interest is classified in the database. While the ability to search across categories for a point of interest is an improvement over the prior art, several problems remain in searching for a point of interest. For example, the name entered by the user may not be the first name used for the point of interest in the database and, therefore, the point of interest will not be found by the user. Another problem is that a name search across categories will yield a greater number of results or hits. As a result, it is difficult for the user to find the potentially more relative points of interest from the generated list, which is often the points of interest closest to the vehicle location. Therefore, what is needed is an improved navigation system which enables the user to search for points of interest across categories while enabling the user to search within the name of the points of interest and relate the point of interest to the vehicle location.

SUMMARY OF THE INVENTION

The present invention provides a navigation system that enables a user to search for points of interest across categories. The user may enter a character string of a desired destination into the navigation system using a user input device. The navigation system searches for points of interest in the database having the character string. The character string may be from the first portion of the name of the point of interest or somewhere in the middle of the name of the point of interest. In this manner, the user is able to locate a point of interest from the database while having a partially incorrect name.

The navigation system may also relate the points of interest to the location of the vehicle. The navigation system senses the vehicle travel information such as vehicle position or vehicle direction. The points of interest are organized relative to the vehicle information. A hit list is generated and displayed in a manner that relates to vehicle location. For example, the closest points of interest to the vehicle location may be organized at the top of the hit list. Alternatively, the points of interest may be organized relative to the direction of the vehicle travel. That is, the points of interest closest to the vehicle and in the direction of the vehicle travel would be displayed at the top of the hit list.

Accordingly, the present invention searches a larger amount of the database to ensure that the user is able to locate the desired destination. The present invention also ensures that the information is organized in a manner such that the potentially most relative information is easily accessible to a user.

BRIEF DESCRIPTION OF THE DRAWINGS

Other advantages of the present invention can be understood by reference to the following detailed description when considered in connection with the accompanying drawings wherein.

DETAILED DESCRIPTION OF A PREFERRED EMBODIMENT

Figure 1:
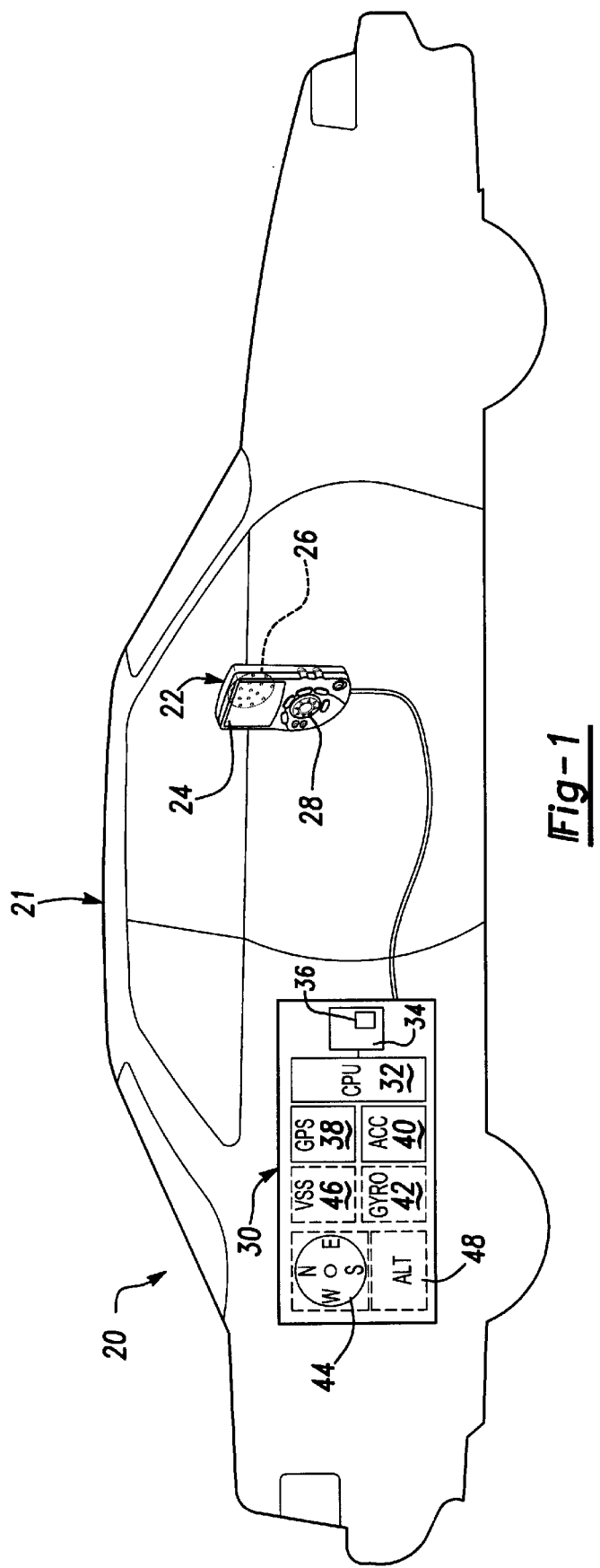
FIG. 1 is a schematic view of a navigation system with the graphical user interface of the present invention installed in a vehicle.

The navigation system 20 of the present invention is shown schematically in FIG. 1 installed in a vehicle 21. The navigation system 20 includes an Operator Interface Module ("OIM") 22 including input and output devices. The OMI 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD-ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available.

The navigation system 20 propagates the position of the vehicle 21 relative to the map database 36, i.e. relative to road segments and intersections. The navigation system 20 also determines the current location of the vehicle 21 in terms of latitude and longitude. Generally, the CPU 32 and position and motion determining devices determine the position of the vehicle 21 relative to the database 36 of roads utilizing dead reckoning, map matching, etc. Further, as is known in navigation systems, the user can select a destination relative to the database 36 of roads utilizing the input device 28 and the display 24. The navigation system 20 then calculates and displays a recommended route directing the driver of the vehicle 21 to the desired destination. Preferably, the navigation system 20 displays turn-by-turn instructions on display 24 and gives corresponding audible instructions on audio speaker 26, guiding the driver to the desired destination.

Figure 2:
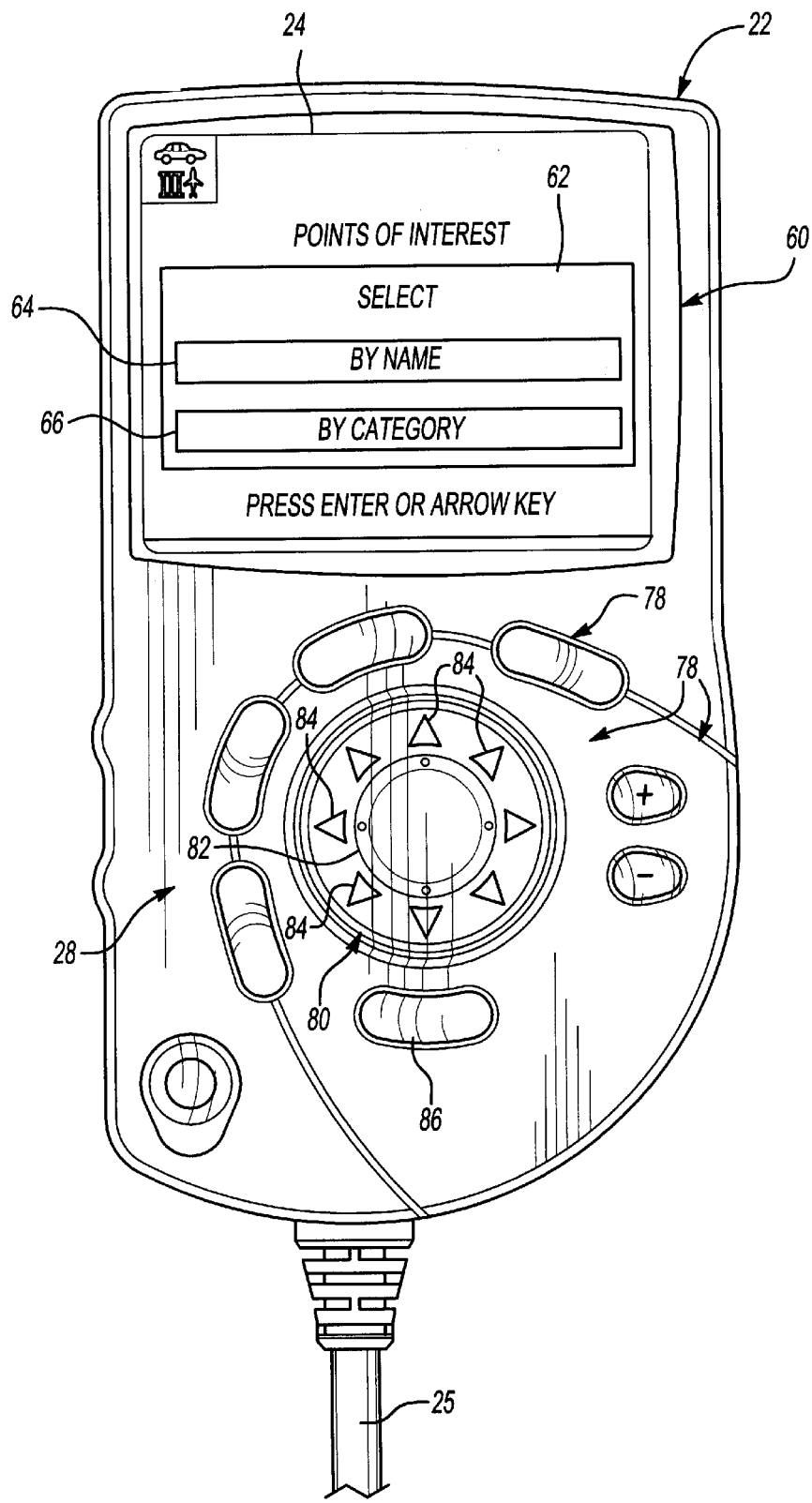
FIG. 2 is a plan view of a displayed device having multiple user inputs and a display screen.

FIG. 2 is a perspective view of one disclosed embodiment of the display device 24 and directional input device 26, preferably designed as an integral unit attached to the CPU by connection 25. The display device 24 includes a screen such as a high resolution LCD or flat panel display. The directional input device 26 includes a multiple of input buttons 78 including, preferably, an eight-way button shown generally at 80 and a selection key 86 such as an "Enter" key. Although an eight-way button is shown, it will be realized that other input devices, such as a joystick, mouse or roller ball can be employed.

The internal disk 82 is pivotally mounted in the eight-way button 80 and is capable of moving in the direction of any one of the directional arrows 84. Movement of the internal disk 82 in the direction of one of the directional arrows 84 transmits a directional signal.

A point of interest screen 60 is shown on display device 24 in FIG. 2. The user may select between the search type option 62 by using the input button 78. Specifically, the user may use the eight-way button 80 to arrow up or down between the search type option 62. The user may conduct a name search by selecting the "By Name" option 64, or the user may conduct a category search by selecting the "By Category" option 66. The "By Category" search option 64 will limit category that is selected by the user in a subsequent display screen (not shown), as in the prior art. Once the search option has been selected, the user may press the enter key 86 to continue the search. The navigation system 20 may have search options other than described above.

Figure 3:
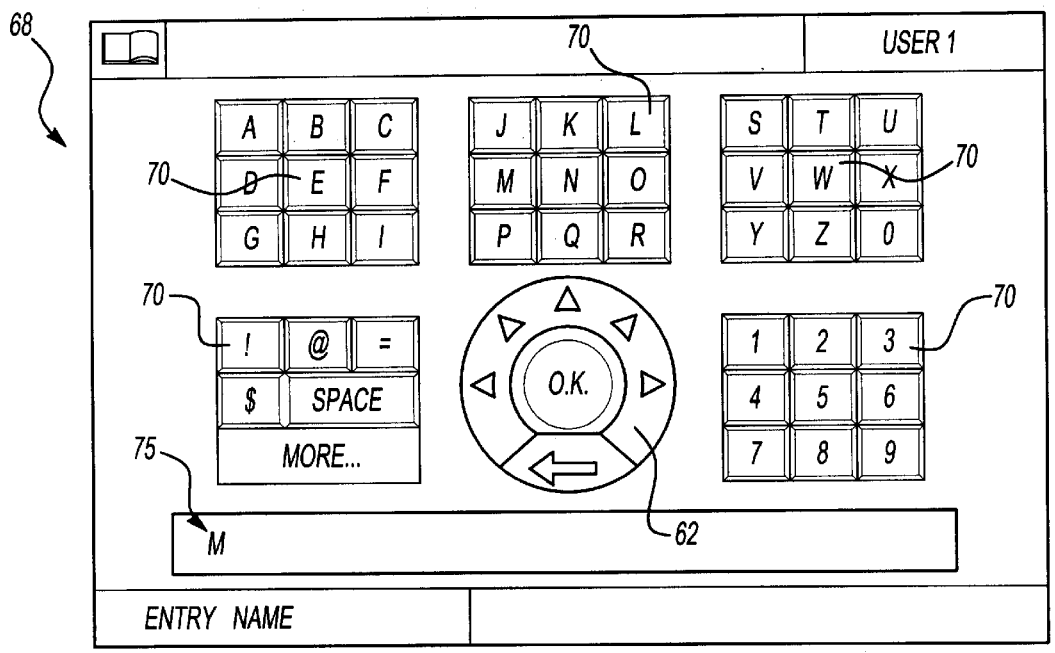
FIG. 3 is a character input display screen.
Figure 4:
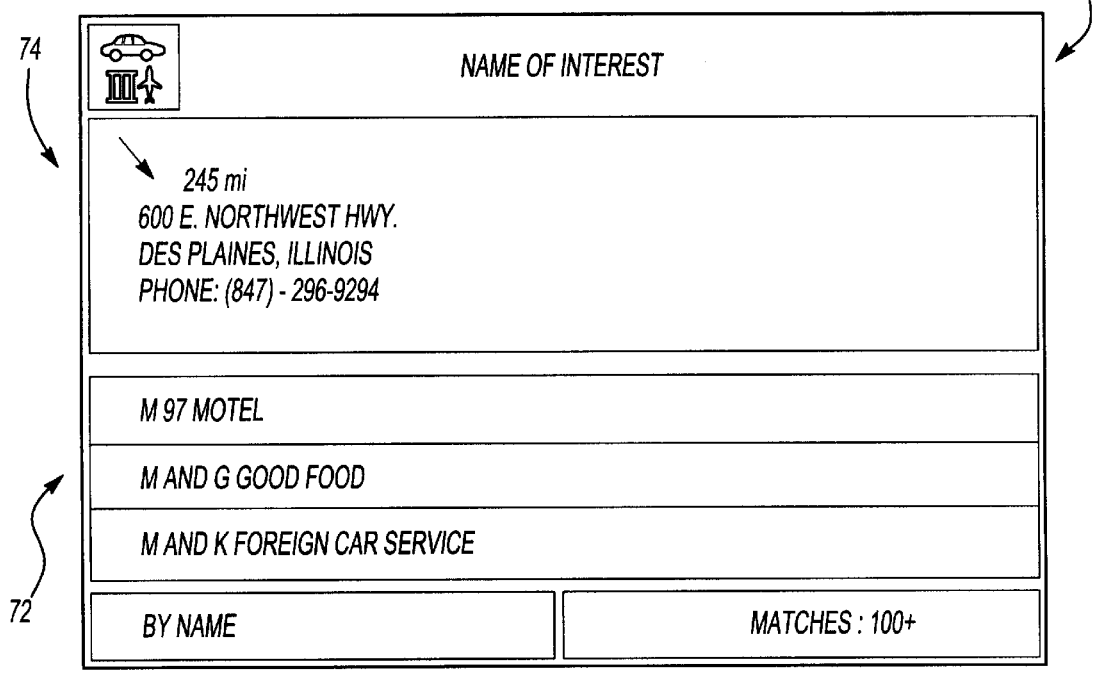
FIG. 4 is a display screen of one embodiment of the present invention.

Once the search option has been selected a character entry screen 68 will appear on the display device as shown in FIG. 3. The user selects characters 70 by using the eight-way button 80 and enter key 86 to build a search string 75 that represents a portion of the name of the point of interest or desired destination. The user may enter just a portion of the name or the entire name. Once the desired character string 75 has been entered the CPU 32 will search the database 36 across the categories for points of interest containing the character string 75. In accordance with one feature of the present invention, the CPU 32 will search across the categories for the character string 75 anywhere in the name of the points of interest. That is, the search will not be limited to points of interest beginning with the character string entered by the user. For example, a particular destination may have a name other than the name commonly used to refer to the location. For example, when searching for a Wendy's fast food restaurant, a prior art search would not reveal a Wendy's listed under the proprietor's name such as Bob's Wendy's. With the present invention, all Wendy's would be found in the database. The results are organization into a hit list and displayed on the display device 24 preferably in alphabetical order beginning with the name starting with the character string 75. All other points of interest are preferably organized alphabetically for names not starting with the character string. The hit list screen 71 is shown in FIG. 4 displaying a hit list 72 including points of interest 73. When a particular point of interest is selected using the eight-way button 80, location information 74 is displayed on the display device 24 above the hit list 72.

In another aspect of the present invention, the points of interest containing the character string 75 are organized relative to vehicle travel information, such as vehicle position and vehicle direction. Vehicle travel information is sensed using the position and motion determining devices described above. In one embodiment, the points of interest are organized and displayed in order of closest point of interest to the vehicle position to farthest point of interest to the vehicle position. This list may be further refined by limiting the displayed hit list to points of interest within a predetermined radius from the vehicle. Alternatively, the radius may be selected by the user. In this manner, the hit list may be limited to the potentially most useful number of points of interest.

In another embodiment, the points of interest are organized and displayed relative to the direction of the vehicle. That is, the closest points of interest in the direction that the vehicle is traveling are displayed at the top of the list while points of interest that are farther in the direction of vehicle travel are displayed further down. Points of interest in the opposite direction of vehicle travel may still be displayed further down the list. For example, if the vehicle is traveling northbound on Interstate-75 the user is not as interested in points of interest in which the vehicle would have to turn around and travel southbound on Interstate-75. In this manner, the most potentially relative points of interest are displayed at the top of the list.

The present invention provides expanded searching capability of the database 36 while maintaining a hit list containing the potentially most relative points of interest. The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of finding a desired destination in a navigation system comprising the steps of:

a) entering a character string of a desired destination into the navigation system;

b) searching points of interest in a database for the character string;

c) sensing vehicle travel information;

d) organizing a hit list including the points of interest containing the character string with reference to the vehicle travel information; and e) displaying the hit list.

2. The method according to claim 1, wherein the character string includes at least one character.

3. The method according to claim 1, wherein the points of interest are organized by categories, and step b) includes searching across the categories.

4. The method according to claim 1, wherein the vehicle travel information includes vehicle position, and step d) includes organizing the hit list in order of closest point of interest to the vehicle position to farthest point of interest to the vehicle position within a predetermined radius.

5. The method according to claim 1, wherein the vehicle travel information includes vehicle direction, and step d) includes organizing the hit list in order of closest point of interest in the direction of the vehicle direction and approximately perpendicular thereto to the farthest point of interest within a predetermined radius in the direction of the vehicle direction and approximately perpendicular thereto.

6. The method according to claim 5, wherein step d) includes further organizing the hit list within a predetermined radius in order of closest point of interest in the direction opposite of the vehicle direction and approximately perpendicular thereto to farthest point of interest in the direction opposite of the vehicle direction and approximately perpendicular thereto.

7. The method according to claim 1, wherein the desired destination is represented by a name, and step b) includes searching for the character string anywhere in the name.

8. The method according to claim 1, wherein step c) occurs at predetermined intervals for sensing new vehicle travel information, and the method further includes the steps of:

f) updating the hit list including the points of interest containing the character string with reference to the new vehicle travel information; and g) displaying an updated hit list.

9. A vehicle navigation system comprising:

a user input device for entering a character string from a portion of a name of a desired destination;

a database having points of interest organized by categories;

at least one navigation sensor for detecting vehicle travel information including vehicle position and vehicle direction;

a display device; and a CPU connected to said input and output devices, said at least one navigation sensor, and said database, said CPU generating a hit list including points of interest containing said character string and organized with reference to said vehicle travel information, said hit list displayed on said display device in response to said character string.

10. The system according to claim 9, wherein the CPU organizes the hit list in order of closest point of interest to the vehicle position to farthest point of interest to the vehicle position within a predetermined radius.

11. The system according to claim 9, wherein the CPU organizes the hit list in order of closest point of interest in the direction of the vehicle direction and approximately perpendicular thereto to farthest point of interest within a predetermined radius in the direction of the vehicle direction and approximately perpendicular thereto.

12. The system according to claim 11, wherein the CPU further organizes the hit list within a predetermined radius in order of closest point of interest in a direction opposite of the vehicle direction and approximately perpendicular to the farthest point of interest in the direction opposite of the vehicle direction and approximately perpendicular thereto.

13. The system according to claim 9, wherein the points of interest are organized by categories, and the CPU searches across the categories.

14. The system according to claim 9, wherein said desired destination is represented by a name, and said CPU searches for said character string anywhere in said name.

15. The method according to claim 1, wherein the vehicle travel information includes vehicle position, and step d) includes displaying the hit list in order of closest point of interest to the vehicle position to farthest point of interest to the vehicle.

16. The method according to claim 1, wherein the vehicle travel information includes vehicle direction, and step d) includes displaying the hit list in order of closest point of interest in the direction of the vehicle direction.

17. The method according to claim 16, wherein step d) includes displaying the hit list in order of closest point of interest in the direction of the vehicle direction and approximately perpendicular thereto to farthest point of interest.

18. The method according to claim 17, wherein step d) includes displaying the hit list in order of closest point of interest in the direction of the vehicle direction and approximately perpendicular thereto to farthest point of interest in the direction of the vehicle direction and approximately perpendicular thereto.

\* \* \* \* \*

(12) INTER PARTES REEXAMINATION CERTIFICATE (591st)
United States Patent
Slominski et al.

(10) Number: US 6,374,180 C1
(45) Certificate Issued: May 2, 2013

(54) POINTS OF INTEREST FOR A NAVIGATION SYSTEM

(75) Inventors: Anthony A. Slominski, Harrison Township, MI (US); Jeffrey Alan Millington, Rochester Hills, MI (US)

(73) Assignee: Beacon Navigation GmbH, Zug (CH)

Reexamination Request:
No. 95/001,852, Dec. 13, 2011

Reexamination Certificate for:
Patent No.: 6,374,180
Issued: Apr. 16, 2002
Appl. No.: 09/661,982
Filed: Sep. 18, 2000

(51) Int. Cl.
*G01C 21/36* (2006.01)
*G01C 21/34* (2006.01)

(52) U.S. Cl.
CPC ................................ *G01C 21/3611* (2013.01)
USPC ............................ 701/438; 340/988; 340/990

(58) Field of Classification Search
None
See application file for complete search history.

(56) References Cited

To view the complete listing of prior art documents cited during the proceeding for Reexamination Control Number 95/001,852, please refer to the USPTO's public Patent Application Information Retrieval (PAIR) system under the Display References tab.

*Primary Examiner* — Jason Proctor

(57) ABSTRACT

A navigation system that enables a user to search for points of interest across categories is provided. The user may enter a character string of a desired destination into the navigation system using a user input device. The navigation system will search for points of interest in the database for the character string. The character string may be from the first portion of the name of the point of interest or somewhere in the middle of the name of the point of interest. In this manner, the user will be able to locate a point of interest from the database while having a partially incorrect name. Additionally, the navigation system may relate the points of interest to the vehicle location, such as by vehicle direction or proximity of the points of interest to the vehicle.

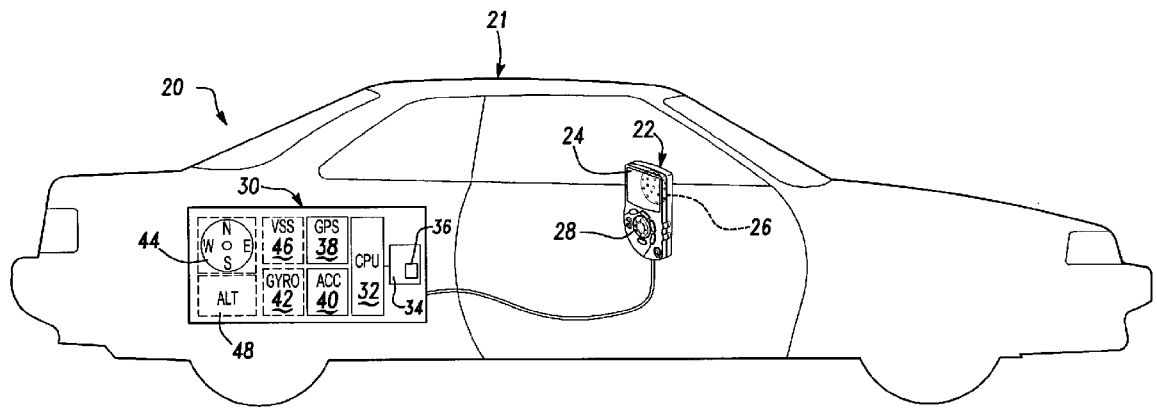

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claim 1 is cancelled.

Claims 2-18 were not reexamined.

\* \* \* \* \*